INVENTOR.
HARRY S. JONES

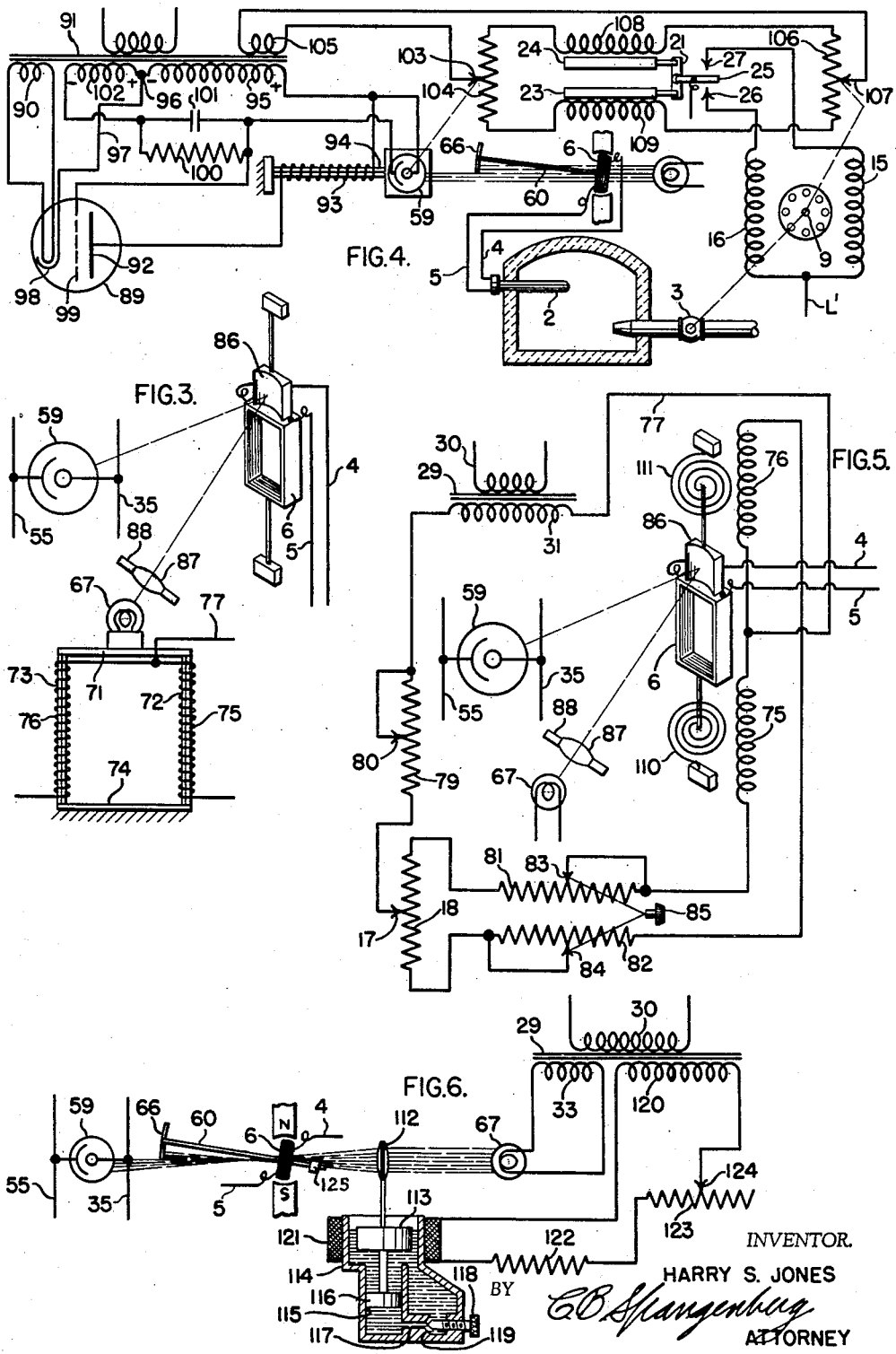

Patented May 18, 1943

2,319,406

UNITED STATES PATENT OFFICE 2,319,406

TEMPERATURE CONTROL INSTRUMENT

Harry S. Jones, Washington, D. C., assignor to The Brown Instrument Company, Philadelphia, Pa., a corporation of Pennsylvania Application October 16, 1941, Serial No. 415,252

7 Claims. (Cl. 250—41.5)

The present invention relates to automatic control apparatus and more particularly to automatic control apparatus of the type in which there is provided follow-up to effect proportionate control of a supply of a condition varying medium and in which this control is effected to give a response that is proportional to the date at which the condition under control is changing.

An object of the invention is to provide automatic control apparatus of the type referred to above wherein the primary controlling element is a highly sensitive device having a delicate actuating member and one in which the adjustments of the control device for regulating the supply of a condition varying agent are effected in response to actuation of said actuating member without placing any restraining force upon the same. By imposing no work on the primary controlling element precision of its actuating element is assured. The specific object of the invention is to provide an apparatus of the type in which there is a follow-up mechanism which will effect proportional control of the condition varying medium and which control takes into account the rate at which the condition is varying. Such a control will quickly bring back to the control point any condition which is varying from said point. This is acomplished since if the condition is changing quickly a larger control effect will be given to the controlling medium than if the condition is changing more slowly.

In the prior are most automatic controlling devices which are adapted to effect proportional regulations to the supply of the condition changing agent were limited to arrangements wherein the primary control element was forced either to do some work and thereby reduce its sensitivity or was clamped and then had some relay mechanism perform the control function. Furthermore, when rate response was added to the ordinary control of the prior art this meant that a highly complicated mechanical or electrical arrangement was necessary.

In accordance with the present invention a highly developed type of control in which both follow-up and rate response are used to adjust the supply of a condition changing agent without in any way affecting the movement of the primary measuring element. In the preferred form of the invention provisions are included for readily effecting a throttling range adjustment whereby the extent of the control device is adjusted in response to a given change in the condition. There is also provided a means for effecting a rheostat adjustment of a change in an operating condition such, for example, as a change in the load of a furnace to bring the condition back to its normal value without affecting the rest of the control system.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 3 is a view showing a modified form of the invention;

Fig. 4 is a view of another modification of the invention;

Fig. 5 is a view of still another modification of the invention and

Fig. 6 is a view of another embodiment of the invention using a different type of apparatus to get the rate response.

Figures 1, 2:
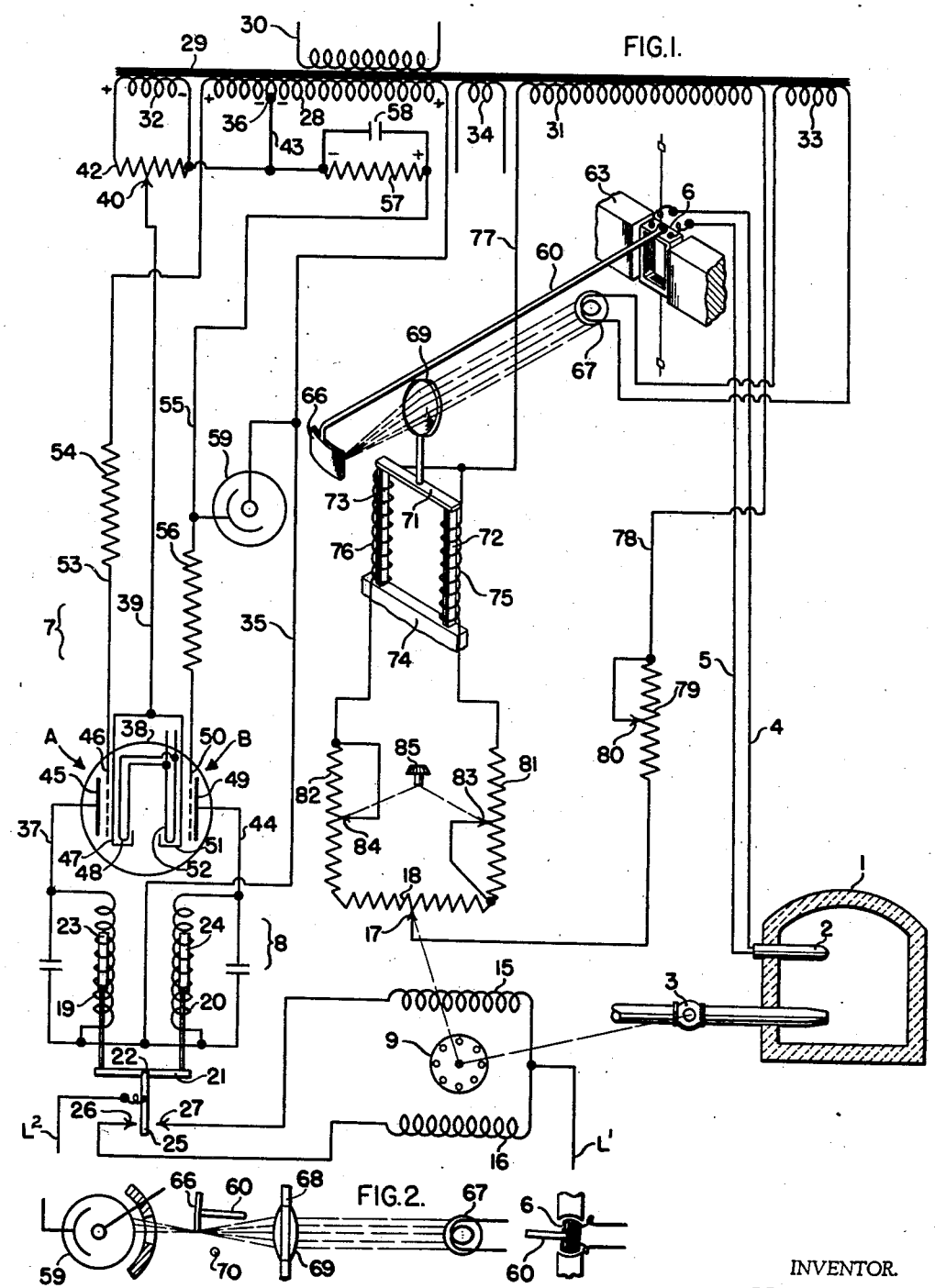
Fig. 1 is a diagrammatic representation of a preferred embodiment of my invention.
Fig. 2 is a diagrammatic drawing showing a top view of the optical system.

While the control system of the present invention may be utilized for controlling the value of any variable condition such as temperature, pressure, flow, liquid level, etc., it is disclosed in the drawings, for purposes of illustration, as controlling a temperature condition, and more particularly, the temperature within the interior of a furnace 1 to which a thermocouple 2 is responsive. The supply of heating agent or fuel to the furnace is controlled by a valve 3 which is adapted to be adjusted in a plurality of positions under control of the thermocouple 2 and thereby in response to changes in the temperature within the furnace 1.

The thermocouple 2 is connected by conductors 4 and 5 to the terminals of the movable coil of a suspension type galvanometer indicated generally at 6. The galvanometer 6 is a highly sensitive measuring instrument capable of responding to extremely weak electric current flows in the conductors 4 and 5, and is utilized in accordance with the invention to control the selective actuation of an electric circuit indicated generally at 7. The manner in which the galvanometer 6 is utilized for effecting such control is illustrated diagrammatically in Figs 1 and 2.

The electric circuit 7, in turn, controls the selective actuation of a relay 8 and thereby controls the operation of a reversible electrical motor 9. The motor 9 positions the valve 3 and also operates a follow-up mechanism. The follow-up mechanism, in turn, controls the operation of the circuit 7 and relay 8, providing a true follow-up control system.

The valve 3 is opened and closed by motor 9 which is selectively controlled for rotation in one direction or the other by field windings 15 and 16, the arrangement being such that when only the field winding 15 is energized, valve 3 is adjusted towards its open position, and when only the field winding 16 is energized, the valve 3 is moved toward its closed position.

The shaft of motor 9 is also operatively connected with a contact 17 which is disposed in engagement with a slidewire resistance 18, and is adapted to adjust that contact along the length of the resistance 18 whenever it operates to adjust the position of valve 3. The contact 17 and slidewire resistance 18 are connected in the follow-up arrangement 10 referred to hereinbefore, and for convenience will hereinafter be referred to as the follow-up potentiometer. When the valve 3 is adjusted toward its open position, the contact 17 is moved toward the right.

The relay generally designated at 8 includes a pair of coils 19 and 20 which are disposed in operative relation with a balanced armature 21. Armature 21 is pivoted for rotation at 22, a point intermediate its ends, and carries an iron core 23 at one end, which core is adapted to move into and out of coil 19, and carries an iron core 24 at the other end, which core is adapted to move into and out of the coil 20. Armature 21 also carries a switch blade 25 which is disposed between a pair of stationary contacts 26 and 27. When the coils 19 and 20 are equally energized, the switch blade 25 is held intermediate and out of engagement with both of the contacts 26 and 27, but when one of the coils 19 or 20 is energized to a greater extent than the other, the switch blade is moved into engagement with the contact 26 or 27 respectively.

Electrical power is adapted to be supplied the reversible motor 9 through the switch blade 25 and contacts 26 and 27 of relay 8 from alternating current supply conductors L¹ and L². As illustrated, the right end of the field windings 15 and 16 of motor 9 are connected together and to the supply conductor L¹. The other end of the field winding 15 is connected to the contact 27 and the other end of the field winding 16 is connected to the contact 26. The switch blade 25 of relay 8 is connected to the supply conductor L² so that on deflection of the switch blade into engagement with the contact 26, energizing current is supplied the field winding 16 to produce rotation of the motor 14 in one direction, and on deflection of the switch blade into engagement with the contact 27, energization current is supplied the field winding 15 to produce rotation of the rotor 14 in the opposite direction.

Electric power is supplied the relay 8 under control of the circuit 7, referred to hereinbefore, from the high voltage secondary winding 28 of a transformer 29 having a line voltage primary winding 30 connected to the alternating voltage supply conductors L¹ and L², and secondary windings 31, 32, 33 and 34. To this end the lower terminals of relay coils 19 and 20 are connected together and are connected by a common conductor 35 to the right end terminal of the secondary winding 28. The upper terminal of relay coil 19 is connected to a tap 36 intermediate the terminals of winding 28 through a circuit which may be traced from said upper terminal to a conductor 37 through the anode to cathode resistance of the triode section A of a twin type electronic valve 38 which also includes a triode section B, a conductor 39 to a tap 40, which is adjustable along a slidewire resistance 42, resistance 42, and a conductor 43 to the tap 36 on transformer secondary winding 28. As shown, the transformer secondary winding 32 is connected across the terminals of the resistance 42. It is noted the portion of the secondary winding 28 to the left of the tap 36 is so wound with respect to the rest of the winding and with respect to the secondary winding 32 that the polarities of the voltages during one half cycle are as shown. The upper terminal of relay coil 20 is connected to the tap 36 on winding 28 through a circuit including a conductor 44, the anode to cathode resistance of the triode B of valve 38, the conductor 39, tap 40, resistance 42, and conductor 43.

When the triode sections A and B of valve 38 are equally conductive, the relay coils 19 and 20 are energized to the same extent and consequently the relay switch arm 25 will be held in an intermediate position out of engagement with both of the contacts 26 and 27, but when one triode section A or B is more conductive than the other, the relay coil 19 or 20 will be energized to a greater extent depending upon which triode section is more conductive.

As illustrated, the triode section A includes an anode 45, a control grid 46, a cathode 47, and a heating filament 48. The triode section B similarly includes an anode 49, a control grid 50, a cathode 51 and a heating filament 52. The heating filaments 48 and 52 may be connected in parallel as shown and receive energizing current through conducting leads, not shown in order not to confuse the drawing, from the transformer secondary winding 34. Anode voltage is supplied the triode sections A and B through the energizing circuits traced above for the relay coils 19 and 20.

The grid circuit for the triode A may be traced from the grid 46 to a conductor 53, in which a current limiting resistance 54 is inserted to the left end terminal of winding 28, tap 36, conductor 43, resistance 42, tap 40, and conductor 39 to the cathode 47. It is noted the winding 32 and the portion of winding 28 to the left of tap 36 are so phased as to oppose each other, the winding 32 tending to render the grid 46 negative with respect to cathode 47 during the half cycle when the anode 45 is positive and the portion of winding 28 referred to tending to render the grid 46 positive with respect to cathode 47 during the same half cycle. Whether the grid 46 is at the same potential as cathode 47 or positive or negative with respect thereto is determined by the adjustment of contact 40 along resistance 42. It is noted the potential of grid 46 is substantially constant during the normal operation of the system.

The grid circuit of the triode B may be traced from the grid 50 to a conductor 55, in which a current limiting resistance 56 and a resistance 57 shunted by a condenser 58 are inserted, to the resistance 42, tap 40 and conductor 39 to the cathode 51. The potential of grid 50 relatively to cathode 51 is adapted to be varied in accordance with the illumination of a photoelectric cell 59. The photoelectric cell 59 may desirably be of the electron emissive type and is connected between the right end terminals of transformer secondary winding 28 and resistance 57. The current conducted by cell 59 passes through resistance 57 so that a potential drop is established across the latter, the magnitude of which potential drop depends upon the illumination of the photoeletcric cell 59. The cell 59 is so connected in the circuit that the polarity of the potential drop established is that shown. The energizing circuit for cell 59 may be traced from the right end terminal of winding 28 to conductor 35, cell 59, conductor 55, resistance 57, and conductor 43 to the tap 36 on winding 28. The illumination of cell 59 is controlled by the galvanometer 6 in response to variations of the temperature within the furnace 1 by means which are described hereinafter.

The adjustable resistance 42 is included in a connection which is common to the grid circuits of both triode sections A and B so that adjustment thereof operates to simultaneously change the potentials of the grids 46 and 50 relatively to their associated cathodes. It is noted that adjustment of the contact 40 in the direction to include more of the resistance 42 in circuit is effective to render the grids more negative with respect to their associated cathodes while adjustment of the contact 40 in the opposite direction is effective to render the grids less negative with respect to their associated cathodes. The contact 40 desirably is adjusted so as to suit the characteristics of the triode sections A and B to thereby establish the most efficient operating conditions.

As noted hereinbefore, the illumination of photoelectric cell 59 and thereby the selective actuation of relays 19 and 20 is controlled by the galvanometer 6, the latter of which in turn is responsive to changes in the electromotive force produced by thermocouple 2 and thereby is responsive to the temperature variations within furnace 1. To this end the galvanometer 6 is provided with a pointer or needle 60 which is carried by the movable coil thereof as illustrated diagrammatically in Figures 1 and 2.

A light aluminum vane 66 which is impervious to light is disposed on the end of the pointer 60. The galvanometer 6 is so arranged with respect to the photoelectric cell 59 and with respect to a source of light, such as a lamp 67, that the vane 66 is adapted to be motivated into and out of the path of the light impinging on photoelectric cell 59 in accordance with the deflections of the movable coil thereof and thereby in accordance with the furnace temperature variations. The lamp 67 is connected to and receives energizing current from the transformer secondary winding 33.

As illustrated, an opaque plate 68, in which a focusing lens 69 is mounted, is also positioned between the photoelectric cell 59 and lamp 67, and the optical system is so arranged that the only light from lamp 67 which is permitted to impinge on cell 59 is that which is transmitted by the lens 69. The lens 69 and the length of the galvanometer pointer 60 are so proportioned that the vane 66 is adapted to move into the path of the light impinging on cell 59 at approximately the point of focus on the lens 69. Thus, a slight movement of the vane 66 in one direction or the other is sufficient to fully illuminate the cell 59 or to cut off all of the light thereto. In accordance with the present invention, the position of the shield 68 and lens 69 is adjustable by an arrangement described hereinafter.

In the normal operation of the system the triode sections A and B of valve 38 are equally conductive when the illumination of the photoelectric cell 59 is a predetermined value. Under this condition, the relay coils 19 and 20 are equally energized and consequently the motor 9 is not actuated for rotation in either direction and remains stationary. Upon slight movement of the vane 66, for example, in a clockwise direction in Figure 1 in response to a decrease in furnace temperature from the desired value the illumination of photoelectric cell 59 is substantially increased whereupon the grid 50 is rendered less negative in potential with respect to its associated cathode 51 and consequently the conductivity of the triode section B is increased. This causes an increase in the energization of relay coil 20 and as a result the relay switch blade 25 is actuated into engagement with the contact 27 to thereby close the energizing circuit for motor field winding 15. The motor 9 is then operated for rotation in the direction to effect an opening adjustment of the fuel valve 3.

Upon slight movement of the vane 66 in the counterclockwise direction in response to an increase in furnace temperature from the desired value, the illumination of the photoelectric cell 59 is substantially decreased, whereupon the grid 50 is rendered more negative in potential with respect to the cathode 51 to thereby reduce the conductivity of the triode section B. This effects a decrease in the energization of relay coil 20 and consequently actuation of the switch blade 25 into engagement with the contact 26 and thereby closure of the energizing circuit to motor field winding 16. The motor 9 is then actuated in the direction to produce a closing adjustment of the fuel valve 3. As noted hereinbefore, rotation of the motor 9 to effect a fuel valve adjustment also effects an adjustment of the follow-up potentiometer 17, 18.

It is noted that deflection of the galvanometer pointer 60 in the counterclockwise direction of an amount to cause the vane 66 to move completely through the light beam and thereby permit illumination of photoelectric cell 59 even though the furnace temperature is higher than the desired value is prevented by the vane 66 striking against a stop 70.

In accordance with the present invention, adjustment of the follow-up potentiometer 17, 18 effects an adjustment of the plate 68 and lens 69 relatively to the lamp 67 and photoelectric cell 59. Such adjustment effects a transverse shift in the focal point of the light beam impinging on cell 59 relatively to the vane 66, and is in the proper direction to restore the illumination of cell 59 to that value which equalizes the conductivities of the triodes A and B and thereby restores the relay switch arm 25 to a point intermediate the contact 26 and 27.

In this manner the valve 3 is modulated to an open or closed position in accordance with the decrease or increase respectively of the temperature within furnace 1.

The lens 69 is mounted on a support 71 which is in turn mounted on a pair of bimetallic members 72 and 73 which, when heated, will warp in opposite directions. These bimetallic members are rigidly mounted on a supporting member 74 which is attached in any suitable manner to the framework of an instrument. Surrounding the bimetallic elements 72 and 73 are electric heaters 75 and 76 respectively which are electrically connected at their upper ends by a wire 77 that is connected to the left hand end of transformer secondary coil 31. The electrical circuits for the heaters are completed through a wire 78 and a resistance 79 that can be varied by means of a slider 80 which serves a purpose to be later described. From the resistance 79 a connection is made to the slider 17 for the potentiometer resistance 18. Heaters 75 and 76 are connected respectively through resistances 81 and 82 which can be adjusted by means of sliding contacts 83 and 84. These resistances serve a purpose which will be described below.

From the above description it will be seen that as the slider 17 is moved to the right or to the left more or less of the resistance 18 will be put into the circuit containing the heaters 75 and 76. In this manner the bimetallic strips will be heated to different degrees and will serve to move the lens 69 in one direction or the other so that the light rays from the lamp 67 will be shifted with respect to the photoelectric cell 59. The resistances 81 and 82 are manually adjusted by manipulation of the knob 85. Rotation of the knob 85 in one direction operates to increase the amount of resistance 82 in circuit and to decrease the amount of resistance 81 in circuit and conversely rotation of the knob 85 in the other direction operates to decrease the amount of resistance 82 and to increase the amount of resistance 81 in the heater circuits respectively.

By reason of the above construction a true follow-up control system is provided. Upon an increase in the temperature of the furnace 1, the galvanometer pointer 60 and thereby the vane 66 are moved in a counter-clockwise direction. Such movement of the vane produces a sharp decrease in the illumination of the photoelectric cell 59 and thereby through the electronic circuit that has been described, causes the motor 9 to be actuated for rotation in a direction to close the valve 3. This operation of the motor also effects an adjustment of the contact 17 along the resistance 18 to the right. Such a movement of the contact 17 will cause an increase in the heat produced by the heater 75 and a decrease in the heat produced by the heater 76 thereupon causing the bimetallic strip 72 to warp in such a fashion that the lens 69 is moved to the right in Fig. 1. When the lens has been moved an amount to restore illumination to the photoelectric cell 59 to a degree in which the sections A and B are equally conductive, the motor 9 is deenergized and the system is stabilized. In this manner the fuel valve 3 is modulated toward a closed position in accordance with the amount of increase in furnace temperature. The operation of the system for a furnace temperature decrease is similar to that above described except that the motor 9 is operated in a direction to open the fuel valve and the contact 17 is moved to the left along resistance 18.

The resistance 79 permits an adjustment of the throttling range of the system so that the amount fuel valve 3 is adjusted in response to a given change of temperature may be varied. For example, upon an adjustment of the contact 80 in a direction to decrease the amount of resistance 79 in the circuit, the voltage applied to the heaters will be increased whereby a smaller adjustment of the contacts 17 along the resistance 18 will be required to effect the follow-up action of the lens 69 to restore the illumination to the cell 59 to a value at which the motor 9 is deenergized. Accordingly a small fuel valve adjustment will be made for a given furnace temperature change. An adjustment of the contact 80 along the resistance 79 in a direction to increase the amount of the resistance of the circuit will have the opposite effect upon the operation of motor 9.

The portion of adjustable resistances 81 and 82 in the follow-up arrangement permits a so-called "reset" adjustment of the system so that on a change in the operating condition of the furnace 1, for example, on a change in the load thereof, or on a change in the B. t. u. content of the fuel being supplied thereto, the tendency of said load change, fuel heating valve change, or other operating condition change, to increase or decrease the furnace temperature may be neutralized. As explained hereinbefore, the resistances 81 and 82 are adapted to be simultaneously adjusted in opposite directions by manipulation of the knob 85. Such manipulation of knob 85 operates to change the initial position of support 71 and thereby the position of lens 69, for a given position of contact 17 along resistance 18, and thereby operates to change the relation between the position of the lens 69 and the adjustment of fuel valve 3 for a given furnace temperature value at which the motor 9 is not energized for rotation in either direction. Accordingly, on such manipulation, the motor 9 is energized for rotation to effect an adjustment of fuel valve 3 and an adjustment of contact 17 along resistance 18 as required to restore the lens 69 to the position in which the motor 9 is deenergized for rotation. Thus, the provision of resistances 81 and 82 permits load compensating or "reset" adjustments to be readily made.

As will be apparent to those skilled in the art, the provision of the adjustable resistances 79, 81 and 82 permits of a wide range of variation in the furnace operating characteristics thereby permitting a desirable good regulation under very different conditions of operation.

The speed with which the lens 69 is shifted as a result of a change in the temperature of the furnace 1 will have an effect on the amount of change in the valve opening. If, for example, the bimetallic strips and the heaters are so designed that they act quickly as a result of a movement of a given movement of the contact 17 along resistance 18 a comparatively small adjustment of the valve 3 will take place before the photoelectric cell 59 has the proper amount of light again upon it. If, on the other hand, the heaters and the bimetallic strips are so designed that the lens 69 will move slowly then there will be a comparatively large adjustment of the valve 3 before the photoelectric cell is again properly lighted. Thus it will be seen that if the strips 72 and 73 and the heaters 75 and 76 are properly designed for the lag in the condition being measured or the furnace characteristics that there will be a correction given in proportion to the rate with which the temperature is changing.

In the normal operation of the device, the lag in time between when the motor 9 is energized and when the heater 75 or 76 has become hot enough to move the lens 69 sufficiently to produce deenergization of the motor will be enough to cause on over-correction of the valve 3. During this time the lens 69 will have been moved to such an extent relative to the vane 66 that the motor will be energized for rotation in the opposite direction to back off the valve adjustment to the proper place. At the same time the current in the heaters 75 and 76 will be correspondingly changed so that the lens 69 will be slowly moved back to its correct position for the furnace temperature. If the rate of heating of the bimetallic strips is properly related to the rate of heat change of the furnace in response to fuel changes, the over-correction and backing off of the valve will be sufficient to quickly return the value of the temperature in the furnace to normal. If the temperature is changing at a faster rate the valve and the slider 17 will be adjusted more before the lens has moved sufficiently to produce deenergization of the motor than it would if the temperature hade only deviated a small amount. It will, therefore, be seen that the arrangement disclosed above not only gives a proportional movement of the valve for each change in temperature but the correction is so made that it takes into account the rate at which the condition is changing as well as the direction and the amount of the change.

In order to change the control point of this instrument, or the normal temperature which the instrument tends to maintain in the furnace 1, it is necessary to shift the photoelectric cell 59 with respect to the galvanometer 6 so that the baffle 66 will intercept the light to the photoelectric cell at some other point. Generally speaking, in an instrument of this type the photoelectric cell 59, the light 67, the stop 70 and the lens supporting bracket 74 will be mounted together on a support which swings around a pivot coaxial with the galvanometer suspensions. In this fashion, as will be seen from Fig. 2, the photoelectric cell and the lens will be changed relative to the baffle 66 so that in order for the cell 59 to get the proper amount of light the baffle will have to be at some other position.

In Fig. 3 there is shown a modification of the invention in which there is provided a concave mirror 86 on the galvanometer 6 in place of the pointer 60 and the baffle 66. Light from the lamp 67 is directed toward the mirror 86 through a lens 87 which is rigidly mounted in a support 88 that is carried by the light supporting bracket 71. From the mirror the light is reflected on to the photoelectric cell 59. Therefore, any deflection of the galvanometer will shift the light beam away from the photoelectric cell thus causing a differential heating of the heaters 75 and 76. Such action of the heaters will shift the light 67 in a direction so that its beam of light can again be deflected upon the photoelectric cell 59.

This operation of the light 67 also gives the follow-up movement of the control instrument that was obtained in Fig. 1 by movement of the lens 69 independently of the light. The speed with which the light 67 is shifted to one side or the other gives a rate response to the control instrument similar to that described in Fig. 1. This arrangement of shifting the light with the lens accomplishes the same results that have been previously described except in a slightly different manner. In some cases it is possible that this arrangement may be preferable to that shown in Fig. 1.

In Figure 4 there is shown another embodiment of the invention in which only one electronic tube is used and in which the photoelectric cell is shifted rather than the lens. The single electronic tube 89 in this embodiment has its filament heated from a secondary winding 90 of a transformer 91. The plate circuit of this tube extends from the plate 92 through a heater 93, that acts on a bimetallic element 94, to the right end of a transformer secondary winding 95. A tap is taken from this winding at 96 and is connected through wire 97 to cathode 98. The grid circuit extends from grid 99 through a resistor 100, that is shunted by a condenser 101, to one end of a transformer secondary winding 102, and from the other end of the transformer through the wire 97 to the cathode 98.

The energizing circuit for the photoelectric cell 59 extends from the right end terminal of the transformer secondary winding 95 through the cell 59 to the resistance 100 and back to the transformer. The cell 59 is, in this case, also connected so that current flowing through it will cause a potential drop across the resistance 100. The magnitude of this drop will depend upon the light falling on the cell.

As the photoelectric cell 59 is moved by the bimetallic strip 94 it shifts a contact 103 along a resistance 104, which resistance forms two legs of a bridge circuit that is energized from a transformer secondary winding 105. The other legs of the bridge circuit are formed by the resistance 106 that is engaged by a movable contact 107 which is connected to the other side of transformer winding 105. Connected between each end of the resistors 104 and 106 are coils 108 and 109 that are variably energized depending upon the positions of the contacts 103 and 107. Cooperating with the coils 108 and 109 are cores 23 and 24 that are attached to a rocking switch carrying arm 21 such as was used in the embodiment of Figure 1. As one of the coils is energized more than the other, the contact 25 will be brought into engagement with contact 26 or 27 to energize motor 9 for rotation in one direction or the other. The motor, in this case, simultaneously adjusts the valve 3 and the contact 107 along the resistance 106.

In the operation of this modification of the invention the flow of current for one half cycle will be as indicated by the symbols on the drawing. At this time, if the temperature is at its normal value, the galvanometer pointer 60 will be in the position shown and a portion of the light from lamp 67 will fall on the cell 59. A small amount of current will then flow through the cell and the plate circuit of the tube 89 will pass enough current to the heater 93 so that the bimetallic element will hold the photoelectric cell in the position shown. Upon an increase in the temperature of the furnace, vane 66 will move in a counterclockwise direction or downwardly to cut off more light to thereby reduce the current flow through the cell 59. Accordingly the grid 99 will become more negative and less current can flow through the plate circuit to the heater 93. As a result of this the bimetallic strip 94 will cool off and move the cell 59 downwardly until the proper amount of light again falls on it to hold the cell in its position.

Movement of the cell 59 causes a movement of contact 103 along resistance 104 in the same direction. If the bridge circuit was balanced, the downward movement of the contact 103 will unbalance it in such a direction that coil 109 will become more energized than coil 108. As a result of this the core 23 will be pulled to the left bringing contacts 25 and 26 into engagement to energize the motor field 16 for rotation to close the valve 3. While the valve is being closed the contact 107 is being moved upwardly along resistance 106 to rebalance the bridge.

From the above it will be seen that if the rate of movement of the photoelectric cell 59 is correlated with the rate of change of the temperature in the furnace 1, the valve 3 will be so adjusted that the temperature will be quickly brought back to normal.

The embodiment of the invention shown in Fig. 5 corresponds very closely to that of Fig. 1 in that the same heater control circuits are used for the two heaters 75 and 76 in Fig. 5 as those shown in Fig. 1. In this case, however, there is shown a concave mirror 86 of the type disclosed in Fig. 3 so that upon a movement of the galvanometer coil light will be reflected from the lamp 67, by this mirror, to the photoelectric cell 59. In this embodiment of the invention the galvanometer coil is suspended by two bimetallic suspension elements 110 and 111 each of which, when it is heated, tends to turn the galvanometer coil in opposite directions. The heaters 75 and 76 are associated with suspensions 110 and 111 respectively. With this embodiment, as the contact 17 is moved by motor 9 relative to the resistance 18 the amount of current flowing through the heaters 75 and 76 is varied. This causes one of the suspension elements 110 or 111 to be heated more than the other so that the galvanometer coil 6 carrying its mirror 86 will be rotated by this force in addition to the one supplied by the thermocouple 2. Therefore, it will be seen that when the temperature of the furnace 2 changes the galvanometer 6 will be deflected to reflect, for example, more light on the photoelectric cell 59. In response to the light on the cell, triode section B of the tube 38 will be made more conductive than the section A so that motor 9 will be energized for rotation in the proper direction to readjust the valve 3 to bring the temperature of the furnace back toward normal. This same rotation of the motor 9 will shift contact 17 along resistance 18 and vary the current flowing through the heaters 75 and 76 in such a manner that the galvanometer coil 6 will deflect in a direction to reflect a smaller amount of light upon the cell 59.

If the rate at which the suspension elements 110 and 111 warp is correlated with respect to the constants of the furnace 2 and the galvanometer, the latter will be deflected in such a fashion that it will compensate for the rate at which the temperature in the furnace is changing. If the temperature is changing fast, a large movement of the contact 17 will take place before the heating has an effect on the galvanometer suspensions, so that the motor will cause the valve to over-travel. Therefore, the galvanometer will deflect to such an extent that it will reflect less light on the photoelectric cell thus causing a backing off movement of the valve, and of the galvanometer, to bring the temperature to its normal value quickly. As the temperature is returning toward its normal value the galvanometer will be slowly moving toward its normal position and a state of balance will be reached with the galvanometer deflecting properly and the temperature at the control point.

The embodiment of the invention disclosed in Figure 6 differs from those previously described in that the rate response or, in effect, the delayed follow-up is procured by means of a dash-pot rather than from heating coils. In Figure 6 the lens 112 is mounted on a stem that is attached to a float 113 which is made of some magnetic material. The float is located in a container 114 made of non-magnetic material and filled with a suitable liquid such as mercury or in some cases oil. A cylinder 115 is formed in the container and receives a piston 116 that is attached to the lower face of the float 113. Liquid in the chamber 115 and below the piston 116 may communicate with the liquid above the piston through an opening 117 at a restricted rate that is governed by the setting of a tapered screw 118 which cooperates with a valve seat 119 formed at the right end of the opening 117.

The transformer 29 in this case is provided with a secondary winding 120 that is connected in a series circuit with a solenoid 121 which surrounds the upper part of the chamber 114. This circuit also includes a current limiting resistance 122 and a variable resistance 123. A contact 124 is slidable along the latter resistance to regulate the amount of it in the circuit and is moved by the motor 9 while the valve 3 is being adjusted, as was contact 17 in Figure 1.

In this embodiment of the invention the lens 112 and the float 113 must move in a vertical direction, so in order for the vane 66 to properly cut the light it must also move in a vertical direction instead of horizontal as shown in the other embodiments of the invention disclosed herein. In order to counterbalance the weight of the pointer 60 and vane 66 extending forwardly a weight 125 is shown on the back end of the pointer 60. It is of course obvious that similar weights should be used if necessary on the galvanometers in the other embodiments of the invention.

In the operation of the Figure 6 embodiment, an electronic circuit and a relay circuit such as are shown at 7 and 8 respectively, in Figure 1 are used. Thus, when the temperature of the furnace 1 decreases the galvanometer will deflect upwardly to permit more light to fall on the photoelectric cell 59. This operates to make the grid 50 of the triode section B less negative so that more current will flow in the plate circuit and through the coil 20. The energization of the coil 20 operates to move contact 25 into engagement with contact 27 energizing motor field 15 so that the motor will open valve 3. As the motor rotates it will also shift contact 124 to the right along resistance 123 to place more of that resistance in the circuit of solenoid 121. Such a movement of contact 124 decreases the energization of the solenoid 121 and permits the float 116, which normally sits higher in the liquid in chamber 114 than is shown, to rise and move lens 112 upward. This movement shifts the path of the beam of light so that it is again partially blocked by the vane 66 to give the follow-up movement.

In this case the speed of the follow-up movement is determined by the rate at which the liquid in chamber 114 can pass through the passage 117 into the cylinder 115 below piston 116. Whether the follow-up movement is upward or downward the speed at which it takes place depends upon the adjustment of the resistor 118. Due to the delayed follow-up, the motor 9 will be energized an amount of time sufficient to give an over-correction to the valve 3 and will move contact 124 to the right enough so that the lens 112 will rise high enough so that vane 66 will cut off more light than is necessary for equilibrium of the electrical system. As a result the motor will be run in a reverse direction far enough to remove the over-correction given to the valve 3, as the temperature returns to normal.

It will be seen from the description that has been given above for the various embodiments of the invention, that in each case there is a delay in the follow-up action which is given as a result of a change in temperature of the furnace 1. When a change in temperature occurs the galvanometer pointer in each case is moved a corresponding amount. This movement changes the light falling on photoelectric cell 59 to change the current flow through the triode section B. As a result of this, one of the solenoids 19 and 20 becomes more energized than the other to run the valve operating motor 9 in one direction or the other to correct the temperature variation. This same operation of the motor changes the heating effect on the bimetallic elements of Figures 1 to 5 inclusive and changes the energization of the solenoid 121 in Fig. 6 so that a follow-up movement will occur to stop the operation of the motor.

In ordinary control systems, this follow-up movement is contemporaneous with the adjustment of the valve so that there is no over-correction of the valve. In the present application, the follow-up movement is delayed so that there is always an over-correction of the valve and an over-adjustment of the contact controlling the heaters for the bimetallic elements and for the solenoid 121. Due to the fact that the valve is adjusted more than is necessary for a given temperature change, the temperature of the furnace will quickly return toward normal. If this over-correction of the valve is not removed the temperature of the furnace would swing too much on the other side of its normal value. As a result of the over-correction, therefore, it is necessary to reverse the operation of the valve operating motor. This reversal takes place because of the fact that in each of the embodiments the follow-up movement is greater than is necessary for the particular position of the galvanometer pointer. Therefore, the valve motor is run in the opposite direction to reduce the over-correction of the valve. At the same time that this over-correction of the valve is being removed and the over-correction of the follow-up is being removed, the temperature of the furnace has begun to return toward normal. For example, in Fig. 1 when the lens 69 is being moved back toward its normal position the galvanometer pointer is also moving and the parts return toward their normal positions at approximately the same rate so that the final adjustment of the valve is sufficient to take care of the original temperature change as the parts return to their normal positions. It will be seen that if the temperature change is fast the valve will be operated a greater amount before the bimetallic elements have, for example, heated sufficiently to give the follow-up movement, whereas if the temperature change is very slow the bimetallic elements will be heated slowly and there will be no appreciable overshooting of the valve adjustment.

Since the heating constants of the bimetallic elements, and the adjustment of the screw 118 which restricts the flow of the liquid in the embodiment of Fig. 6, are adjusted in accordance with the characteristics of the furnace whose temperature is being controlled, it will be seen that the control of this application will take into account not only the amount and direction of the temperature change but also the rate at which the temperature changes. This means that a larger correction is given if the temperature is changing rapidly than would be given if the temperature was changing slowly. Therefore, the temperature of the furnace 1 will always be brought back to its normal value quickly and with a minimum amount of hunting.

While in accordance with the provisions of the statutes, I have illustrated and described the best form of this invention now known to me, it would be apparent to those skilled in the art that changes may be made in the form of the apparatus disclosed without departing from the spirit of this invention as set forth in the appended claims, and that in some cases certain features of this invention may sometimes be used to advantage without a corresponding use of other features.

Having now described my invention, what I claim as new and desire to secure by Letters Patent is:

1. In a control instrument, the combination of means to produce a path of radiant energy, a device operative in response to variations in the radiant energy, a first member deflected in response to variations in the value of a condition to be controlled to vary the amount of radiant energy applied to said device, a second member also movable to vary the radiant energy applied to said device and operating in opposition to said first member, an electric circuit varied by said device in response to variations in radiant energy applied thereto as said first member moves, mechanism operative by electric circuit changes to move said second member in a direction to neutralize the effect of said first member, said mechanism including a part operative to delay the neutralizing action an amount of time proportional to the rate of deflection of the first member.

2. In a control instrument, a means to produce a path of radiant energy, means responsive to variations in the value of the radiant energy in said path, an electric circuit controlled in one direction or an opposite direction by said responsive means as more or less radiant energy falls thereon, a member deflecting in response to variations in the value of a condition to be controlled and operating as a result of said deflections to vary the amount of radiant energy reaching said responsive means, a device movable to counteract the effect of said member on said radiant energy path, means operated by changes in said electric circuit due to deflections of said member to move said device, said device including a part to delay the counteracting effect for a time proportional to the rate of change of the condition.

3. In a control instrument, a means to produce a beam of light, a light responsive element upon which said beam is directed, an electric circuit in which said element is connected and which is changed in one direction or the opposite direction as more or less light falls on said element, a member deflecting in response to variations in the value of a condition, and operative to vary the amount of light falling on said element in accordance with the deflections thereof, a device operative to counteract the effect of said member on said beam of light, said device including a bimetallic element and a heater therefor, said heater operating to produce a warping of said bimetallic element in one direction or the other depending upon the movement of said deflecting member, and means moved by said bimetallic element as it warps to act on said beam of light in a manner opposite to the action of said member.

4. In a control instrument, a means to produce a beam of light, a photoelectric cell upon which said beam is directed and which is responsive to variations in the amount of light reaching the same, a member deflecting in response to variations in the value of a measurable condition and operating to vary the light falling on said cell in accordance with the deflections thereof, a device acting to counteract the effect of said deflecting member comprising a bimetallic element and a heating coil therefor, means operated by said cell in response to a change in light falling thereon to produce a heating of said coil whereby the bimetallic element will be bent, the delay in action of the heating coil and bimetallic element producing an over-correction of the counteracting effect, and means moved by said bimetallic element to act on said beam of light in a manner opposite to the action of said member.

5. In a control instrument, means to produce a beam of light, a photoelectric cell responsive to variations in light and upon which said beam is directed, a lens to direct light to said cell, a member deflecting in response to variations in the value of a measurable condition and acting to vary the light falling on said cell in response to the deflections thereof, a support for said lens consisting of a bimetallic element that will bend in response to changes in temperature to shift said lens and thereby change the direction of said path of light, a heater for said bimetallic element operative in response to variations in light on said cell to change the heat produced by the heater so that said bimetallic element will bend in such a direction that the lens will shift the beam of light in a direction to counteract the effect of the deflectable member.

6. In a control instrument, means to produce a beam of light, a photoelectric cell upon which said beam is directed and which is responsive to variations in the light reaching it, a member deflectable in response to variations in the value of a measurable condition and operative to vary the light falling on said cell, a lens to direct the light to the cell, means to shift said lens to change the path of the light beam, a device for moving said lens, means operative in response to a change in value of the light falling on said cell as said member deflects to shift the lens and therefore the direction of the beam of light whereby the light will fall in its original amount upon the cell, and means to vary the rate at which said lens will be shifted in accordance with the rate of change of the condition.

7. In a control instrument, means to produce a beam of light, a photoelectric cell upon which said beam is directed and which is responsive to variations in the light falling theron, a member deflectable in response to variations in the value of a condition to be controlled, said member acting to vary the amount of light falling on said cell as the member deflects, a lens serving to direct light from said means to said cell, means to move said lens and thereby shift the path of said beam of light in response to variations in light received by said cell as determined by the position of the deflecting member, said last named means operating to shift the lens in a direction to redirect the original amount of light on the cell, said last means comprising a part operating in accordance with the rate of change of the condition being measured.

HARRY S. JONES.